United States Patent
Chen et al.

(10) Patent No.: US 11,018,875 B2
(45) Date of Patent: May 25, 2021

(54) METHOD AND SYSTEM FOR SECURE CONNECTED VEHICLE COMMUNICATION

(71) Applicant: OnBoard Security, Inc., Wilmington, MA (US)

(72) Inventors: Cong Chen, Worcester, MA (US); Virendra Kumar, Watertown, MA (US)

(73) Assignee: OnBoard Security, Inc., San Diego, CA (US)

( * ) Notice: Subject to any disclaimer, the term of this patent is extended or adjusted under 35 U.S.C. 154(b) by 97 days.

(21) Appl. No.: 15/999,936

(22) Filed: Aug. 31, 2018

(65) Prior Publication Data

US 2019/0116048 A1 Apr. 18, 2019

Related U.S. Application Data

(60) Provisional application No. 62/605,889, filed on Aug. 31, 2017.

(51) Int. Cl.
*H04L 29/06* (2006.01)
*H04L 9/32* (2006.01)
(Continued)

(52) U.S. Cl.
CPC .......... *H04L 9/3268* (2013.01); *H04L 9/0819* (2013.01); *H04L 9/3236* (2013.01);
(Continued)

(58) Field of Classification Search
CPC ... H04L 9/3268; H04L 9/0819; H04L 9/3226; H04L 9/3242; H04L 2209/38; H04L 2209/84; H04W 4/48
See application file for complete search history.

(56) References Cited

U.S. PATENT DOCUMENTS

2014/0136838 A1* 5/2014 Mossbarger .......... H04L 9/3263
713/156
2015/0381349 A1* 12/2015 Nikolaenko ............. G09C 1/00
713/189
(Continued)

OTHER PUBLICATIONS

"Whyte et al.", "A Security Credential Management System for V2V Communications", 2013 (Year: 2013).*
(Continued)

*Primary Examiner* — Darshan I Dhruv
(74) *Attorney, Agent, or Firm* — Polsinelli LLP

(57) ABSTRACT

A method for producing linkage values to be contained within pseudonym digital certificates of a security credential management system for connected vehicles, including the following steps: providing a linkage value function that expresses linkage values as a function of a number of input parameters that include a linkage seed input from a pseudonym certificate authority processor entity and a plurality of inputs from a registration authority processor entity including a vehicle identifier and at least one index relating to a time period for the linkage value; producing a Boolean circuit representative of the function for a particular combination of the number of input parameters; and executing a garbled circuit protocol on the Boolean circuit between the registration authority processor entity and the pseudonym certificate authority processor entity, whereby the pseudonym certificate authority processor entity privately derives a linkage value for the particular combination of the number of input parameters.

24 Claims, 6 Drawing Sheets

(51) Int. Cl.
H04L 9/08 (2006.01)
H04W 4/48 (2018.01)
(52) U.S. Cl.
CPC ............. *H04L 9/3242* (2013.01); *H04W 4/48* (2018.02); *H04L 2209/38* (2013.01); *H04L 2209/84* (2013.01)

(56) References Cited

U.S. PATENT DOCUMENTS

| | | | | |
|---|---|---|---|---|
| 2016/0044031 | A1* | 2/2016 | Kolesnikov | H04L 9/3218 713/170 |
| 2016/0112206 | A1* | 4/2016 | Cizas | H04L 9/3263 713/158 |
| 2016/0241389 | A1* | 8/2016 | Le Saint | H04L 9/14 |
| 2017/0222990 | A1* | 8/2017 | Romansky | H04L 9/14 |
| 2017/0346637 | A1* | 11/2017 | Zhang | H04L 9/0643 |
| 2018/0234255 | A1* | 8/2018 | Fu | H04L 9/08 |
| 2019/0245705 | A1* | 8/2019 | Kumar | H04L 67/12 |
| 2019/0289462 | A1* | 9/2019 | Kim | H04W 8/20 |

OTHER PUBLICATIONS

"Advanced Encryption Standard (AES)", Federal Information Processing Standards Publication 197, Nov. 26, 2001, 51 Pages.
Albrecht M.R., et al., "Lucky Microseconds: A Timing Attack on Amazon's stn Implementation of TLS", 2015, 30 Pages.
Ananth P., "Cryptography with Updates", 2016, pp. 0-68 (69 pp.).
Araki T., et al., "Optimized Honest-Majority MPC for Malicious Adversaries—Breaking the 1 Billion-Gate per Second Barrier", IEEE Symposium on Security and Privacy (SP), 2017, 20 Pages.
Bellare M., et al., "Breaking and Provably Repairing the SSH Authenticated Encryption Scheme: A Case Study of the Encode-then-Encrypt-and-MAC Paradigm", ACM Transactions on Information and System Security, Mar. 21, 2004, pp. 1-33.
Bellare M., et al., "Efficient Garbling from a Fixed-Key Blockcipher", IEEE Symposium on Security and Privacy, May 19, 2013 (full paper), 34 Pages.
Ben-Efraim A., et al., "Efficient Scalable Constant-Round MPC via Garbled Circuits", International Conference on the Theory and Application of Cryptology and Information Security, Nov. 2017, 29 Pages.
Bittau A., et al., "The Final Nail in WEP's Coffin", IEEE Symposium on Security and Privacy, 2006, 15 Pages.
Boldyreva A., et al., "Provable-Security Analysis of Authenticated Encryption in Kerberos", IET Information Security, vol. 5, No. 4, Dec. 2011, pp. 1-25 (full version).
Boneh D., et al., "Constrained Pseudorandom Functions and Their Applications", International Conference on the Theory and Application of Cryptology and Information Security, Sep. 9, 2013, pp. 1-23.
Boyle E., et al., "Functional Signatures and Pseudorandom Functions", Oct. 29, 2013, 34 Pages.
Brecht B., et al., "A Security Credential Management System for V2X Communications", IEEE Transactions on Intelligent Transportation Systems, vol. 19, No. 12, Dec. 2018, pp. 3850-3871 (22 pp.).
Choi S.G., et al., "Efficient Three-Party Computation from Cut-and-Choose", Annual Cryptology Conference, 2014, pp. 513-530 (18 pp.).
Cleve R., "Limits on the Security of Coin Flips When Half the Processors are Faulty", STOC '86 Proceedings of the eighteenth annual ACM symposium on Theory of computing, 1986, pp. 364-369.
"Secure Hash Standard (SHS)", Federal Information Processing Standards Publication (FIPS PUB) 180-4, 2015, 36 Pages.
Franz M., et al., "CBMC-GC: An ANSI C Compiler for Secure Two-Party Computations", 2015, 5 Pages.
Franz M., et al., "Compilation for Secure Two-Party Computations", 2015, pp. 143-144.

Furukawa J., et al., "High-Throughput Secure Three-Party Computation for Malicious Adversaries and an Honest Majority", 2017, 36 Pages.
Goldreich O., et al., "A Completeness Theorem for Protocols with Honest Majority", Proceeding STOC '87 Proceedings of the nineteenth annual ACM symposium on Theory of computing, 1987, pp. 218-229.
Gueron S., et al., "Fast Garbling of Circuits Under Standard Assumptions", Jun. 13, 2017, pp. 1-46.
Huang Y., et al., "Amortizing Garbled Circuits", Annual Cryptology Conference, 2014, pp. 1-29.
Ishai Y., et al., "Secure Computation with Minimal Interaction, Revisited", Annual Cryptology Conference, 2015, 81 Pages.
Ishai Y., et al., "Secure Multi-Party Computation with Identifiable Abort", Annual Cryptology Conference, 2014, 37 Pages.
Ishai Y., et al., "Identifying Cheaters Without an Honest Majority", Theory of Cryptography Conference, 2012, pp. 21-38 (18 pp.).
Kiayias A., et al., "Delegatable Pseudorandom Functions and Applications", CCS '13 Proceedings of the 2013 ACM SIGSAC Conference on Computer and Communications Security, 2013, 27 Pages.
Kolesnikov V., et al., "FleXOR: Flexible garbling for XOR gates that beats free-XOR", Jun. 14, 2014, 24 Pages.
Kolesnikov V., et al., "Improved Garbled Circuit: Free XOR Gates and Applications", International Colloquium on Automata, Languages, and Programming, 2008, 12 Pages.
Lindell Y., et al., "A Proof of Security of Yao's Protocol for Two-Party Computation", Jun. 26, 2006, pp. 1-25.
Lindell Y., et al., "Blazing Fast 2PC in the Offine/Online Setting with Security for Malicious Adversaries", Oct. 12, 2015, CCS '15 Proceedings of the 22nd ACM SIGSAC Conference on Computer and Communications Security, pp. 1-32.
Lindell Y., "Fast Cut-and-Choose Based Protocols for Malicious and Covert Adversaries", Feb. 8, 2015, 33 Pages.
Lindell Y., "Fast Secure Two-Party ECDSA Signing", Annual International Cryptology Conference, Jul. 2017, 38 Pages.
Mohassel P., et al., "Fast and Secure Three-party Computation: The Garbled Circuit Approach", CCS '15 Proceedings of the 22nd ACM SIGSAC Conference on Computer and Communications Security, Oct. 2015, pp. 591-602 (12 pp.).
"National Highway Traffic Safety Administration", Federal Motor Vehicle Safety Standards; V2V Communications, NPRM, Federal Register, vol. 82, No. 8, Jan. 12, 2017, pp. 3854-4019 (166 pp.).
Paterson K.G., et al., "Reactive and Proactive Standardisation of TLS", International Conference on Research in Security Standardisation, 2016, 28 Pages.
"Processing personal data in the context of C-ITS", Data Protection WG of the C-ITS Platform, Jan. 3, 2017, 34 Pages.
Rabin M.O., "How to Exchange Secrets with Oblivious Transfer", May 20, 1981, 26 Pages.
Sahai A., et al., "How to Use Indistinguishability Obfuscation: Deniable Encryption, and More", STOC '14 Proceedings of the forty-sixth annual ACM symposium on Theory of computing, 2014, 39 Pages.
Wang X., et al., "Authenticated Garbling and Efficient Maliciously Secure Two-Party Computation", CCS '17 Proceedings of the 2017 ACM SIGSAC Conference on Computer and Communications Security, Oct. 30-Nov. 3, 2017, pp. 21-37.
Wang X., et al., "Faster Secure Two-Party Computation in the Single-Execution Setting", Annual International Conference on the Theory and Applications of Cryptographic Techniques, 2017, pp. 399-424 (26 pp.).
Wang X., et al., "Global-Scale Secure Multiparty Computation", CCS '17 Proceedings of the 2017 ACM SIGSAC Conference on Computer and Communications Security, 2017, pp. 1-35.
Whyte W., et al., "A Security Credential Management System for V2V Communications," 2013 IEEE Vehicular Networking Conference, XP032567195, 8 pages, DOI: 10.1109/VNC.2013.6737583 [retrieved on Feb. 11, 2014].
Wiki: "SCP2: Linkage Values", EE Requirements and Specifications Supporting SCMS Software Release 1.2, 2017, 3 Pages.

(56) References Cited

OTHER PUBLICATIONS

Yao A.C., "Protocols for Secure Computations", 23rd Annual Symposium on Foundations of Computer Science (SFCS 1982), Nov. 1982, pp. 1-5.
Zahur S., et al., "Two Halves Make a Whole" Reducing Data Transfer in Garbled Circuits using Half Gates, 34th Eurocrypt, Annual International Conference on the Theory and Applications of Cryptographic Techniques, Apr. 2015, 28 Pages.

* cited by examiner

METHOD AND SYSTEM FOR SECURE CONNECTED VEHICLE COMMUNICATION

RELATED APPLICATION

This application claims priority from U.S. Provisional Patent Application No. 62/605,889 filed Aug. 31, 2017, and said Provisional Patent Application is incorporated herein by reference.

FIELD OF THE INVENTION

This invention relates to the field of connected vehicle communication and, more particularly, to a system and technique that efficiently provides security and privacy for connected vehicle communication.

BACKGROUND OF THE INVENTION

A part of the background hereof is disclosed in W. Whyte, A. Weimerskirch, V. Kumar, and T. Hehn, "A Security Credential Management System For V2V Communications", IEEE Vehicular Networking Conference, 2013. (The security credential management system described therein is sometimes referred to as "SCMS.") The SCMS for vehicle-to-vehicle ("V2V") communication was developed under a cooperative agreement with the US Department of Transportation. The system issues digital certificates to participating vehicles for establishing trust among them, which is necessary for safety applications primarily crash-avoidance. It supports four main use cases, namely, bootstrapping, certificate provisionary, misbehavior reporting and revocation. A stated design goal thereof was to provide both security and privacy to the largest extent reasonable and possible. To achieve the latter, vehicles are issued pseudonym certificates, and the provisioning of those certificates is divided among multiple semi-autonomous "organizations". A stated challenge was to facilitate efficient revocation of certificates while providing security and privacy against attacks from insiders.

An important feature of the SCMS is that in order to support privacy against an insider at the SCMS (so that an insider can't tell which credentials belong to a particular car, or even which credentials belong to each other) while still allowing a misbehaving vehicle to be identified and revoked, a complicated architecture has been put in place where no less than four SCMS component organizations (a Pseudonym Certificate Authority (PCA), a Registration Authority (RA), and two Linkage Authorities (LAs)) participate in issuing each certificate.

A challenge in a vehicle credential management system is to maintain the privacy of individual vehicles while still enabling efficient revocation of misbehaving vehicles. In the Security Credential Management System, SCMS provisions multiple, concurrently valid pseudonym certificates to each participating vehicle in the system. Each pseudonym certificate issued to a vehicle contains a random looking linkage value (as opposed to publicly identifiable information) that can be used for authentication. While the linkage value in each certificate is different, all the linkage values for a vehicle are derived from the same initial linkage seed. At any time, a "sufficient" number of pseudonym certificates are issued to each vehicle so that minimal "re-use" of a certificate is required. Intuitively, this is to ensure privacy of a vehicle across multiple authentications. The number of certificates and linkage values needed to be generated is obviously very large.

A vehicle's behavior may deviate from normal either due to malfunction (of some sensors, for example), or due to intentional misbehavior, and it may not always be easy to distinguish between the two. In SCMS a vehicle is, therefore, revoked only if it exhibits sustained abnormal behavior. In the SCMS, misbehavior identification involves an organization entity called Misbehavior Authority (MA) on top of the four organizations summarized above as being involved in linkage value generation. At a high level, MA collects misbehavior reports from vehicles. On a regular basis, it processes these reports and creates lists of pseudonym certificates that it wants to gather more information on. For suspect pseudonym certificates, it is primarily interested in knowing how many (and which) certificates belong to one vehicle, and for reporter pseudonym certificates, it wants to learn how many unique vehicles are present in a given set of pseudonym certificates. To this end, MA sends linkage values to PCA and gets back the corresponding pre-linkage values. Then, it sends those pre-linkage values to one of the Linkage Authorities (LAs) to get back correlations among them. Then, for vehicles that need to be revoked (as determined by MA), it requests the corresponding linkage seeds for the current time period from both of the LAs, and publishes them on the Certificate Revocation List (CRL). Using the published seeds, anyone can generate all current and future (but not past) linkage values and compare them with the ones in the certificates to identify revoked vehicles. From the foregoing, it will be understood that any improvements in the efficiency, security, and privacy of the process of generating linkage values would be advantageous.

The SCMS existing design is relatively secure in the model where SCMS component operators are not malicious. However, in order to provide privacy guarantees even in this limited model it requires four separate organizational entities; that is, the Registration Authority, the Pseudonym Certificate Authority, and the two Linkage Authorities. There is significant cost overhead necessary for the maintenance and operation of these parallel organization structures. The system is susceptible to attacks, especially from an insider. This is highly undesirable as the impact of a successful malicious exploit could be dangerous and severely undermine the potential crash avoidance benefits of V2V.

SCMS considers a restricted attack model where an adversary can corrupt at most one authority. This is insufficient in today's connected world, and even if it is thought that widespread collusion can't go undetected for long, a disgruntled employee at a linkage authority could, for example, reveal information to PCA (without getting detected) that would compromise vehicles' privacy.

It is among the objects of the invention to improve efficiency, security, and privacy in security credential management systems and methods, and to address limitations and shortcomings of prior art approaches including, but not limited to, those treated above.

SUMMARY OF THE INVENTION

The present invention provides improvements in efficiency, security, and privacy in a security credential management system. A secure computation approach to generating linkage values, using garbled circuits, together with a simplification of the organizational entities of the existing SCMS, and while maintaining substantial compatibility with the basic SCMS scheme, results in very substantial efficiencies and cost saving. In accordance with features of the invention, the garbled circuits are optimized to reduce their size and processing time. Multiple linkage values can be generated using a single garbled circuit instead of having one garbled circuit per linkage value. This is achieved while maintaining privacy and improving the resistance of the system against attacks from a malicious insider.

A form of the invention is applicable for use in conjunction with a security credential management system that produces and manages pseudonym digital certificates issued to vehicles and used by vehicles to establish trust in vehicle-to-vehicle communications, the security credential management system including a pseudonym certificate authority processor entity which issues pseudonym digital certificates to vehicles and a registration authority processor entity that validates, processes and forwards requests for pseudonym digital certificates to the pseudonym certificate authority processor entity. A method is set forth for producing linkage values to be contained within pseudonym digital certificates, said linkage values being derived ultimately from linkage seeds which enable, in predetermined circumstances, at least some of the certificates containing linkage values derived from a particular linkage seed to be revoked, the method including the following steps: a) providing a linkage value function that expresses linkage values as a function of a number of input parameters that include a linkage seed input from the pseudonym certificate authority processor entity and a plurality of inputs from the registration authority processor entity including a vehicle identifier and at least one index relating to a time period for the linkage value; b) producing a Boolean circuit representative of said function for a particular combination of said number of input parameters; and c) executing a garbled circuit protocol on said Boolean circuit between said registration authority processor entity and said pseudonym certificate authority processor entity, whereby said pseudonym certificate authority processor entity privately derives a linkage value for said particular combination of said number of input parameters. The registration authority processor entity sends a pseudonym certificate request to the pseudonym certificate authority processor entity, which puts a decrypted linkage value in the certificate.

In an embodiment of this form of the invention, said linkage seed input comprises a linkage seed value obtained by hashing a key value with a value of a specified index, which can be a vehicle identifier index, and the method further comprises varying said input parameters and repeating step (c) to obtain a multiplicity of linkage values, which can comprise a linkage value for each combination of said input parameters. In a further embodiment, after the garbled circuit protocol of step (c), the pseudonym certificate authority stores a garbled representation of said linkage seed and uses it during the next garbled circuit protocol executed for the same vehicle identifier index.

In another form of the invention, the method includes the following steps: a) providing a linkage value function that expresses linkage values, encrypted with a linkage value key available to said pseudonym certificate authority processor entity and to the exclusion of said registration authority processor entity, as a function of a number of input parameters that include, from said pseudonym certificate authority processor entity, a linkage seed key to be utilized for generating linkage seed values and said linkage value key to be utilized for encrypting linkage values, and include, from said registration authority processor entity, a vehicle identifier; b) producing a Boolean circuit representative of said function for a particular combination of said number of input parameters including a linkage seed value derived from said linkage seed key and a particular vehicle identifier, and a particular value of a linkage value sequence index for said particular vehicle identifier; c) executing a garbled circuit protocol on said Boolean circuit between said registration authority processor entity and said pseudonym certificate authority processor entity such that said registration authority processor entity obtains encrypted linkage values, each for said particular combination of said number of input parameters and said particular value of a linkage value sequence index; and d) wherein said registration authority processor entity conveys said encrypted linkage values to said pseudonym certificate authority processor entity and said pseudonym certificate authority processor entity decrypts them using said linkage value key.

The efficient use of garbled circuits allows replacement of the currently defined SCMS protocols with ones that provide a greater level of security against malicious operators at the SCMS organizational entities and allow the removal of currently employed "linkage authority" entities altogether, thereby reducing organizational complexity and cost.

Further features and advantages of the invention will become more readily apparent from the following detailed description when taken in conjunction with the accompanying drawings.

DETAILED DESCRIPTION

Figure 1:
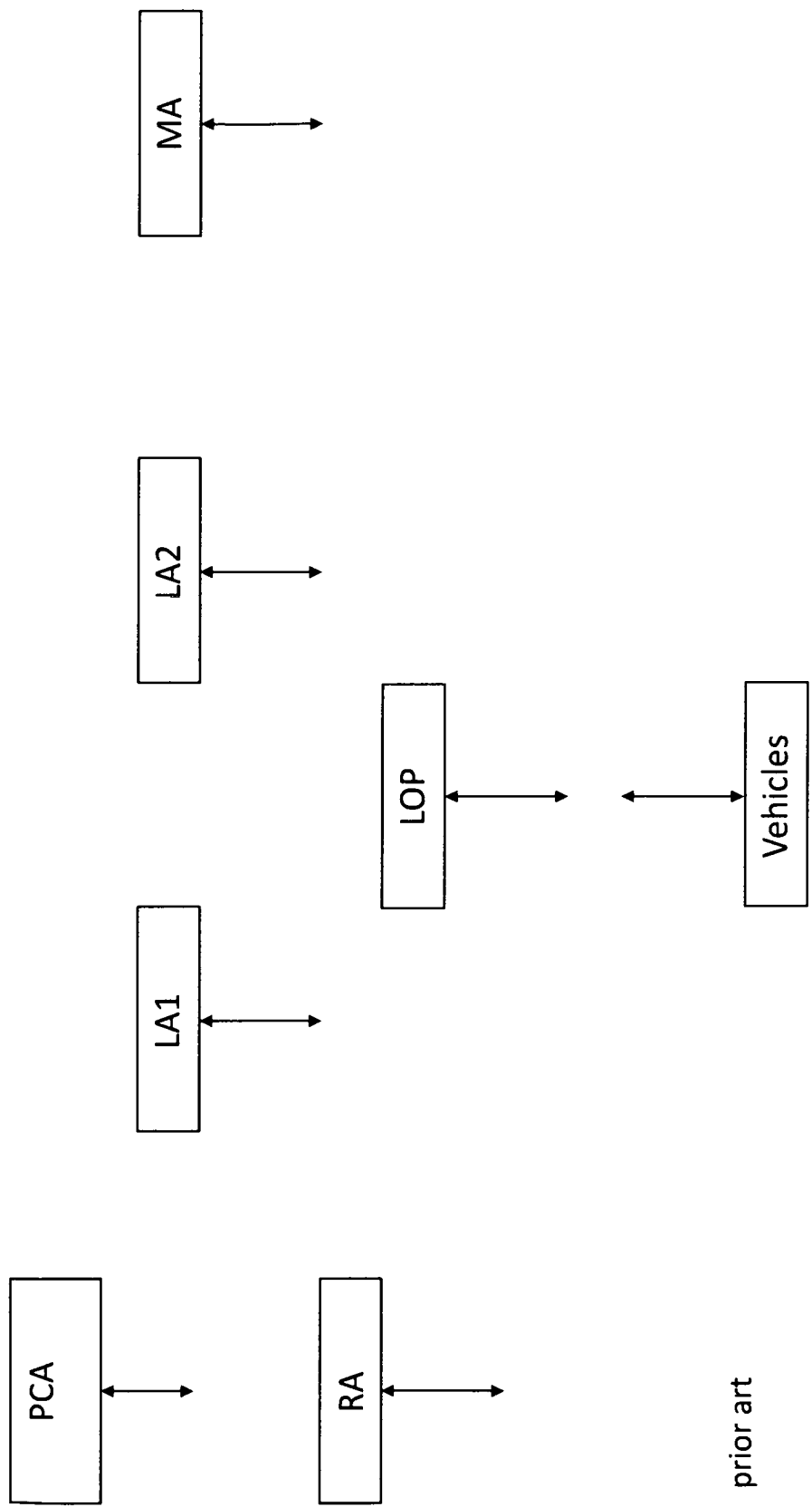
FIG. 1 is a simplified block diagram of a prior art security credential management system for vehicle-to-vehicle communication.

FIG. 1 is a simplified diagram of portions of the Security Credential Management System (SCMS) as disclosed in Whyte et al., 2013, supra, incorporated herein by reference. (An updated version of the SCMS is disclosed in Benedikt Brecht, Dean Therriault, Andre Weimerskirch, William Whyte, Virendra Kumar, Thorsten Hehn, and Roy Goudy. "A Security Credential Management System for V2X Communications." In IEEE Transactions on Intelligent Transportation Systems, pp. 1022, 2018, which maintains, for the most part, the general nature of the SCMS described in the 2013 document.) Reference can be made to the published documents for a thorough understanding of the SCMS, the simplified version of FIG. 1 being useful for understanding the background and context of some of the improvements hereof.

In FIG. 1, the Pseudonym Certificate Authority (PCA) issues pseudonym certificates to devices (especially, vehicles). The Registration Authority (RA) validates, processes, and forwards requests for pseudonym certificates to the Pseudonym Certificate Authority. The Misbehavior Authority (MA) processes misbehavior reports to identify potential misbehavior by devices and, if necessary, revokes and adds devices to a Certificate Revocation List (not shown). It also initiates the process of linking a certificate identifier to the corresponding enrollment certificates, and adding the enrollment certificate to an internal blacklist. The Linkage Authority (LA) generates linkage values which are used in the certificates and support efficient revocation. There are two LAs in the SCMS, referred to as LA1 and LA2. The splitting prevents the operator of an LA from linking certificates belonging to a particular device. The location Obscurer Proxy (LOP) hides the location of the requesting device by changing source addresses, and thus prevents linking of network addresses to locations. Additionally, when forwarding information to the Misbehavior Authority (MA), the LOP shuffles the reports to prevent the MA from determining the routes of vehicles reporting misbehavior.

In the simplified diagram of FIG. 1, the functions of the illustrated authorities are intended to be consistent with the descriptions thereof in the Whyte et al. 2013 publication, supra, and do not share certain private data and cryptographic materials unless otherwise indicated. The authorities are indicated herein as having their functions implemented, at least in part, by separate processor entities, with proper separation of logical roles.

Figure 2:
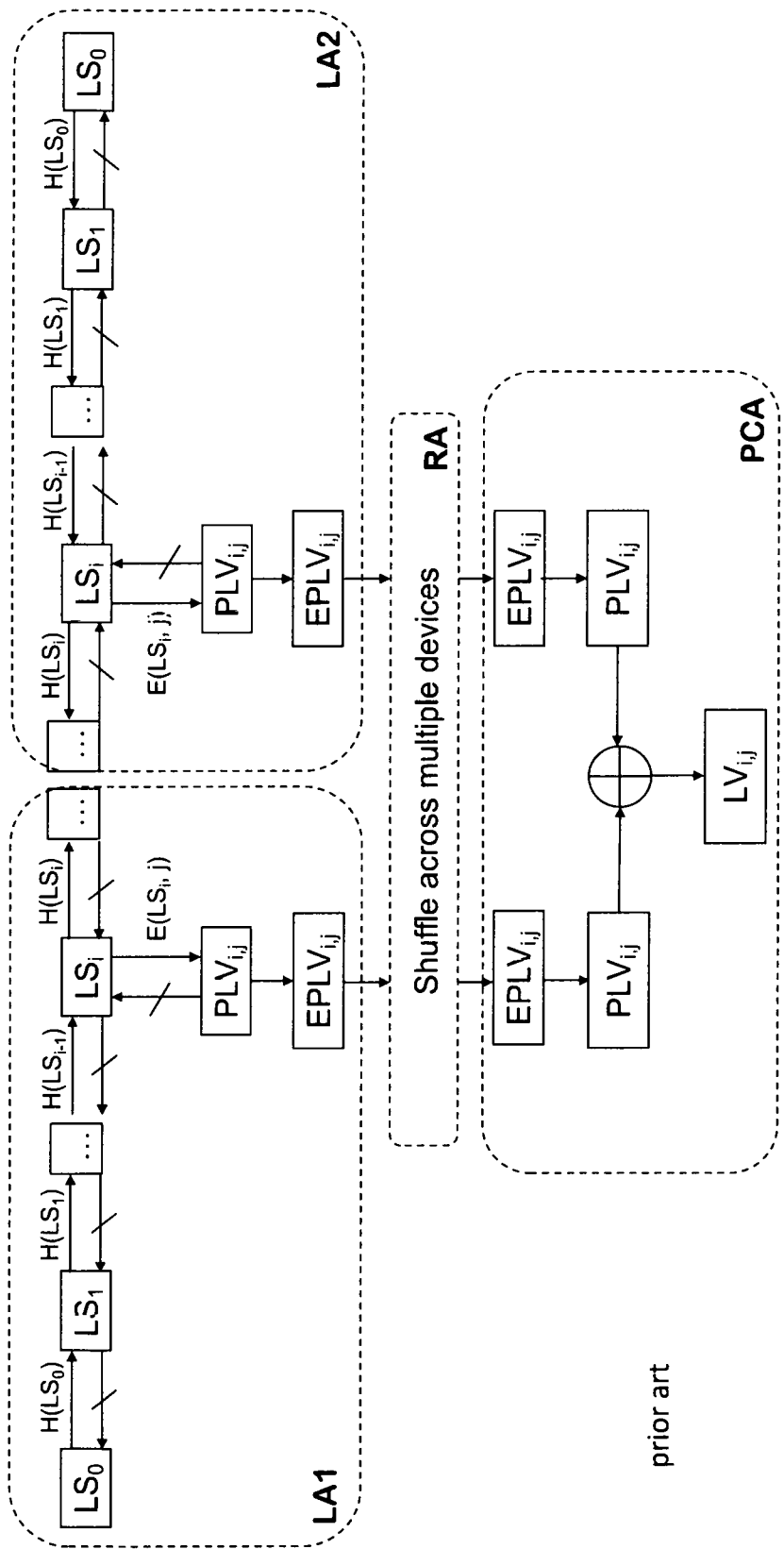
FIG. 2 is a diagram that illustrates the process used in a current security credential management system for generating linkage values from linkage seeds.

FIG. 2 is a diagram that illustrates the process used in the current Security Credentials Management System (SCMS) for generating linkage values from linkage seeds, utilizing at least four of the previously summarized authority processor entities of the SCMS; namely the two linkage authorities LA1 and LA2, the Registration Authority RA, and the Pseudonym Certificate Authority PCA. (These abbreviations are shown in bold in the dashed-line blocks in the Figure, which illustrate operational performance of the blocks relating to the described process.) Each of the linkage authorities LA1 and LA2 independently generates a random number as a linkage seed (that is, a 128 bit random number designated $LS_0$ in the diagram). As described in the Whyte et al. 2013 document, supra, the linkage seed is subjected to a chain of hash operations (each represented by H in the diagram), the number of hashes in the chain being determined by an index i, where i is the number of the particular week for which the linkage values are being computed. As seen in the diagram, the forward progressing arrows do not have a diagonal slash line, but the backward-directed arrows have a diagonal slash line. This denotes that the processing is not reversible (the hash function being a one-way function). Accordingly, after i successive hashes, the result is $LS_i$; that is, the linkage seed hashed i times. Next, $LS_i$ is encrypted, using j as the subject of the encryption and $LS_i$ as the encryption key, where the index j designates the particular linkage value during the $i_{th}$ week, where j is between 1 and 20. The resultant pre-linkage values are designated $PLV_{ij}$. As described in Whyte et al., 2013, supra, the pre-linkage values are encrypted (to hide these values from the registration authority processor entity) as $EPLV_{ij}$ and shuffled across multiple vehicles by the registration authority processor entity (to avoid revealing and associating a sequence of linkage values for a particular vehicle) and then decrypted at the pseudonym certificate authority processor to recover the pre-linkage values $PLV_{ij}$. The two pre-linkage values are then exclusive-ORed to obtain the linkage value $LV_{ij}$ and this prevents either of the linkage authorities (LA1 or LA2) from being able to learn the ultimately derived linkage value.

In the existing SCMS, the private inputs of each LA1 and LA2 are the entire database of initial linkage seed values, consisting of one entry per vehicle (e.g. for 300 million vehicles). The PCA has no private inputs and the RA private inputs are the vehicle identifier (denoted EE), i, and j, where, for the SCMS, is i equals 52 weeks (for one year, or 52×30 for a possible 30 year car life, according to SCMS) and j equals 20 linkage values per week, all of which computes to potentially about 9 trillion linkage values for 300 million vehicles over a 30 year period. For a fifteen year vehicle life, the number would be approximately 4.5 trillion linkage values.

Among the limitations of the existing SCMS is that the inputs of the linkage authorities LA1 and LA2 are extremely large (e.g. hundreds of millions of entries). In embodiments hereof, multiparty protocols are employed to advantage. However, the complexity of multiparty computation protocols grows quickly with the number of parties, which would be the four relevant organizations (LS1, LS2, RA, and PCA) in the current SCMS design. In embodiments hereof, functionalities of LA1 and LA2 are effectively "merged" with PCA, so a much less complex two party secure computation protocol (using a garbled circuit technique) can be employed. Also, the initial linkage seed is computed on the fly inside secure computation using a hash function and inputs from PCA and RA, so one parties' inputs become relatively small.

Including the described modifications, the secure computation protocol has the following features: There are only two parties involved in the computation; namely the PCA and the RA. The linkage value functionality is modified such that instead of taking the initial linkage seed-pair as input, it takes $K_{LS}$, an initial linkage seed generation key held by the PCA, and EE (vehicle identifier) as inputs to generate the initial linkage seed-pair inside the functionality itself. The private input of the PCA is $K_{LS}$, and the private input of the RA are EE, i, and j. The private output of the PCA are the linkage value; Iv(EE, i, j) (that is, linkage values as a function of EE, i, and j, and the private output of RA is the address for Iv(EE, i, j) (that is, a pointer to that address).

Figure 3A:
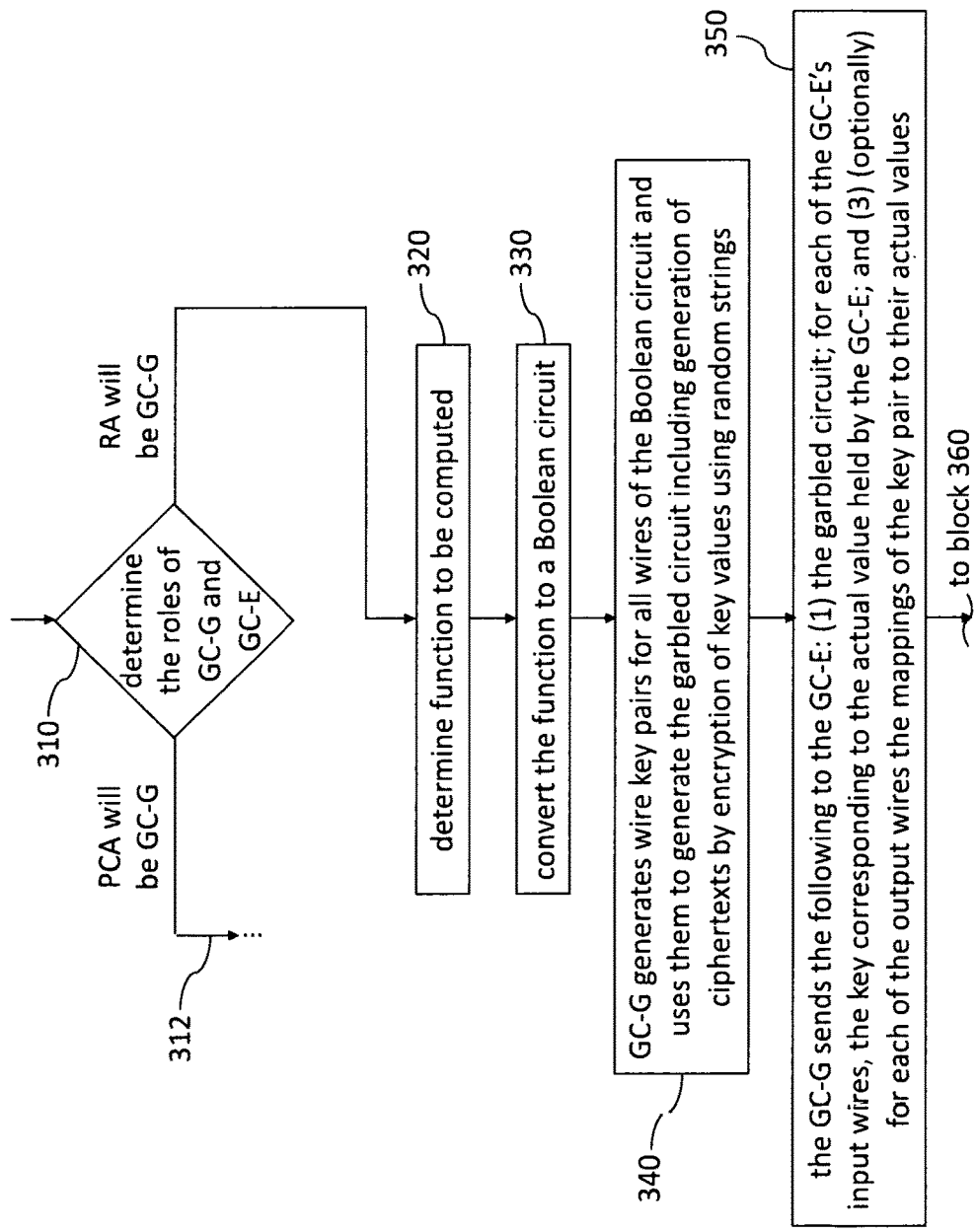
FIG. 3, which includes FIG. 3A and FIG. 3B placed one below another, is a flow diagram of a routine for generating linkage values in accordance with an embodiment of the invention.
Figure 3B:
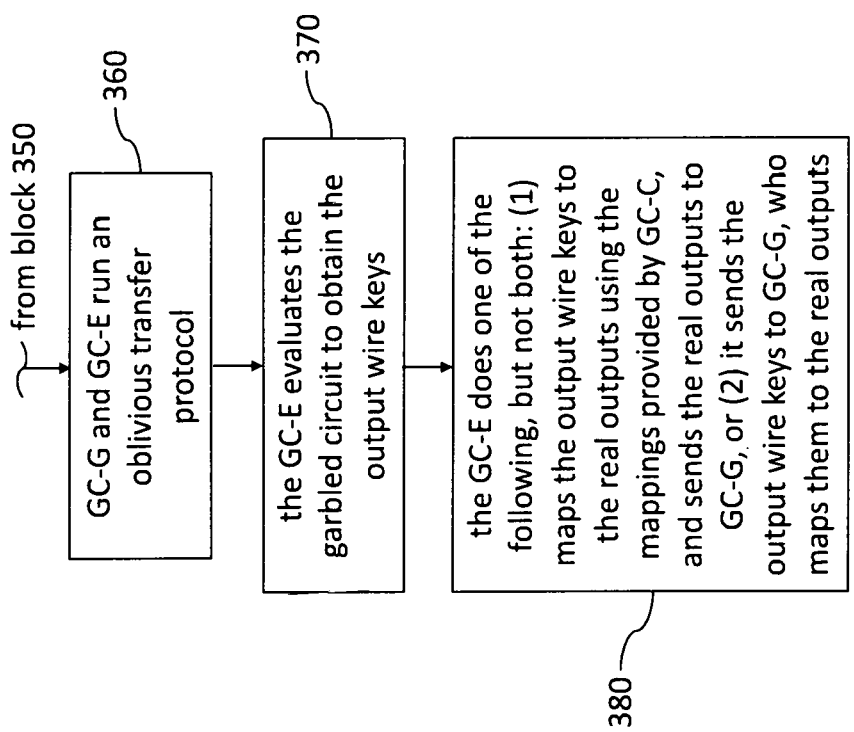

Referring to FIG. 3, there is shown a flow diagram of a routine, for implementation by the registration authority processor entity and the pseudonym certificate authority processor entity, for implementing a routine using a garbled circuit protocol for determination of linkage values, in accordance with an embodiment of the invention. (Regarding garbled circuits, reference can be made, for example, to Andrew C, Yao, "Protocols For Secure Computations" (Extended Abstract). In $23^{rd}$ Annual Symposium on Foundations of Computer Science, Chicago, Ill., USA, 3-5 Nov. 1982, pages 160-164, 1982; and Yehuda Lindell and Benny Pinkas, "A Proof of Security of Yao's Protocol for Two-Party Computation", J. Cryptology, 22(2):161-188, 2009; and Michael O. Rabin, "How to Exchange Secrets by Oblivious Transfer", Tech. Memo TR-81, Aiken Computation Laboratory, Harvard U., 1981.) A determination is made, as represented by decision block 310 as to which processor entity will serve as the garbled circuit generator (GC-G) and which will serve as the garbled circuit evaluator (GC-E). In the present embodiment, it is preferred, although not required, that the registration authority processor entity have the garbled circuit generator role and that the pseudonym certificate authority have the garbled circuit evaluator role, so that option is described in further detail, it being understood that the desired result could be obtained using the pseudonym certificate authority processor entity as the GC-G, as represented by the output branch 312 of block 310. The function to be computed is determined, as represented by the block 320. In this case the function, for linkage value determination, for a particular vehicle identifier EE, is $LV_{ij}$ is a function of $LS_o$, EE, i, and j, the function including the operations described in conjunction with FIG. 2. (Regarding the hashing operations, reference can be made, for example, to description of Secure Hashing Algorithm in: Federal Information Processing Standards Publication 180-4: Secure Hash Standard August, 2015. Regarding the encryption operations, reference can be made, for example, to description of Advanced Encryption Standard in: Federal Information Processing Standards Publication 197: Advanced Encryption Standard, Nov. 26, 2001. Regarding linkage value functionality, reference can be made, for example, to Whyte et al., 2013, supra; Brecht et al., 2018, supra; and SCMS CV Pilots Documentation, Special Cryptographic Primitives in SCMS, SCP2: Linkage Values, URL https://wiki.campllc.org/display/SCP/SCP2%3A+Linkage+Values, Feb. 24, 2017.) Then, as represented by the block 330, the function is converted to a Boolean circuit (see, for example, Martin Franz, Andreas Holzer, Stefan Katzenbeisser, Christian Schallhart, and Helmut Veith. "Compilation for Secure Two-Party Computations." Software Engineering & Management, 2015. Next, as represented by the block 340, the GC-G generates wire key pairs for all wires of the Boolean circuit and uses them to generate the garbled circuit, including generation of ciphertexts by encryption of key values using random strings. Then, as represented by the block 350, the GC-G sends the following to the GC-E: (1) the garbled circuit; (2) for each of the GC-E's input wires, the key (one of the pair) corresponding to the actual value held by the GC-E; and, (3) optionally, for each of the output wires, the mappings of the key pair to their actual values (sent only if the GC-E needs to do the mapping). Then, as represented by the block 360, GC-G and GC-E run an oblivious transfer protocol, transferring the following so that GC-G doesn't learn any of the GC-E's inputs: for each of the GC-E's input wires, the key (one of the pair) corresponding to the actual value. Then, as represented by the block 370, the GC-E evaluates the garbled circuit using all the input wire keys (both GC-G's and GC-E's) to obtain the output wire keys. Next, as represented by the block 380, the GC-E does one of the following, but not both: (1) it maps the output wire keys to the real outputs using the mappings provided by GC-G (item (3) of block 350), and sends the real outputs to GC-G, or (2) it sends the output wire keys to GC-G, who maps them to the real outputs. Accordingly, in this manner, as listed after block 380, the achieved private outputs of the pseudonym certificate authority processor entity are Iv(EE, i, j) and of the registration authority processor entity is the address for Iv(EE, i, j).

A limitation of the embodiment described in conjunction with FIG. 3 is a consequence of the fact that garbled circuit protocols are one-time use only, i.e., for security to hold, the entire protocol (blocks 340 to 380 of FIG. 3) needs to be executed for every new set of inputs, even if the inputs change only slightly. For example, say RA wants to generate multiple linkage values for the same vehicle and same i (but different j, of course), then it needs to repeat the entire process for every linkage value even though the computation would proceed identically except for the last part where j is used. To overcome this limitation of secure multiparty computation, one might be tempted to generate all the linkage values of a given vehicle in just one protocol execution, but that would not be secure. The reason is that if all the linkage values of a given vehicle were to be generated in one protocol execution, then PCA would learn which all linkage values belong to any vehicle. This would violate one of the main design goals of the SCMS system, i.e., protection of end-user's privacy from attacks by SCMS insiders.

Figure 4:
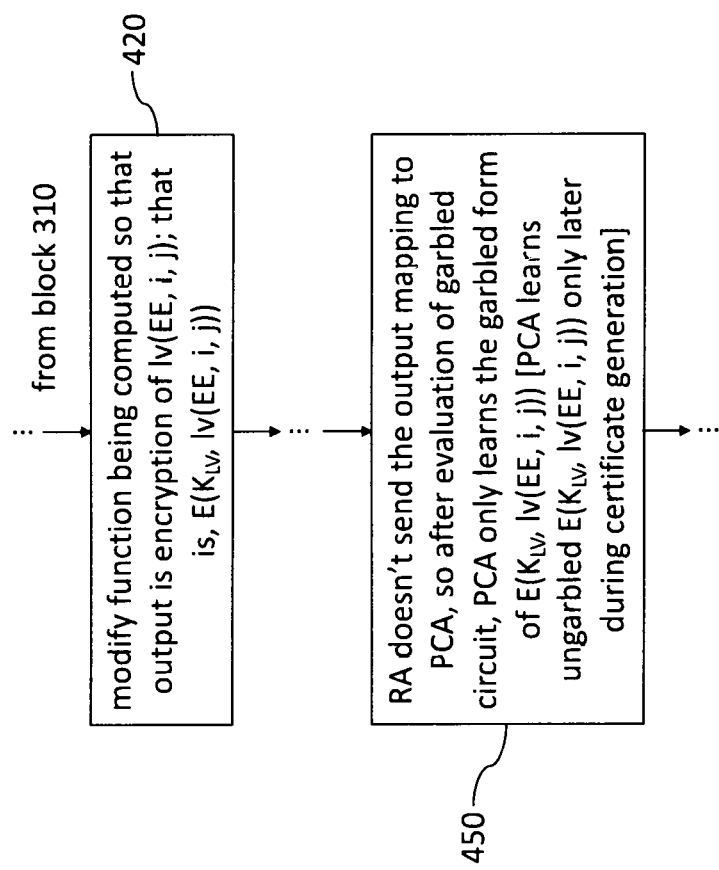
FIG. 4 is a flow diagram of a routine, which is a modification of the FIG. 3 routine, for generating linkage values in accordance with a further embodiment of the invention.

To solve this limitation, and permit batch processing, in accordance with a further embodiment of the invention, the embodiment described in conjunction with FIG. 3 is modified as shown in FIG. 4. As represented by block 420 (and as a modification to the block 320 of FIG. 3), the function being computed (and hence also the Boolean circuit of block 430) is modified so that the output is not plain Iv(EE, i, j) but its encryption using a key $K_{LV}$ that is known only to PCA, denoted $E(K_{LV}, Iv(EE, i, j))$. Then, unlike the embodiment of FIG. 3, the RA doesn't send the output mapping (block 350 of FIG. 3) to PCA, so after the evaluation of the garbled circuit PCA only learns the garbled form of $E(K_{LV}, Iv(EE, i, j))$, denoted $G-E(K_{LV}, Iv(EE, i, j))$. The PCA learns $E(K_{LV}, Iv(EE, i, j))$ (and hence also Iv(EE, i, j) as it knows $K_{LV}$) only later during certificate generation.

With the foregoing modifications, the modified secure computation can be summarized as follows: PCA has two inputs $K_{LS}$ and $K_{LV}$. The RA now has only 1 input EE, because the number and specificity of linkage values (and hence i and j values) are embedded inside the Boolean circuit. The outputs are not a single linkage value, but a set of them. The private outputs of the PCA are $G-E(K_{LV}, Iv(EE, i1, j1))$ $G-E(K_{LV}, Iv(EE, in, jn))$, and the private outputs of RA are $E(K_{LV}, Iv(EE, i1, j1))$ . . . $E(K_{LV}, Iv(EE, in, jn))$.

Figure 5:
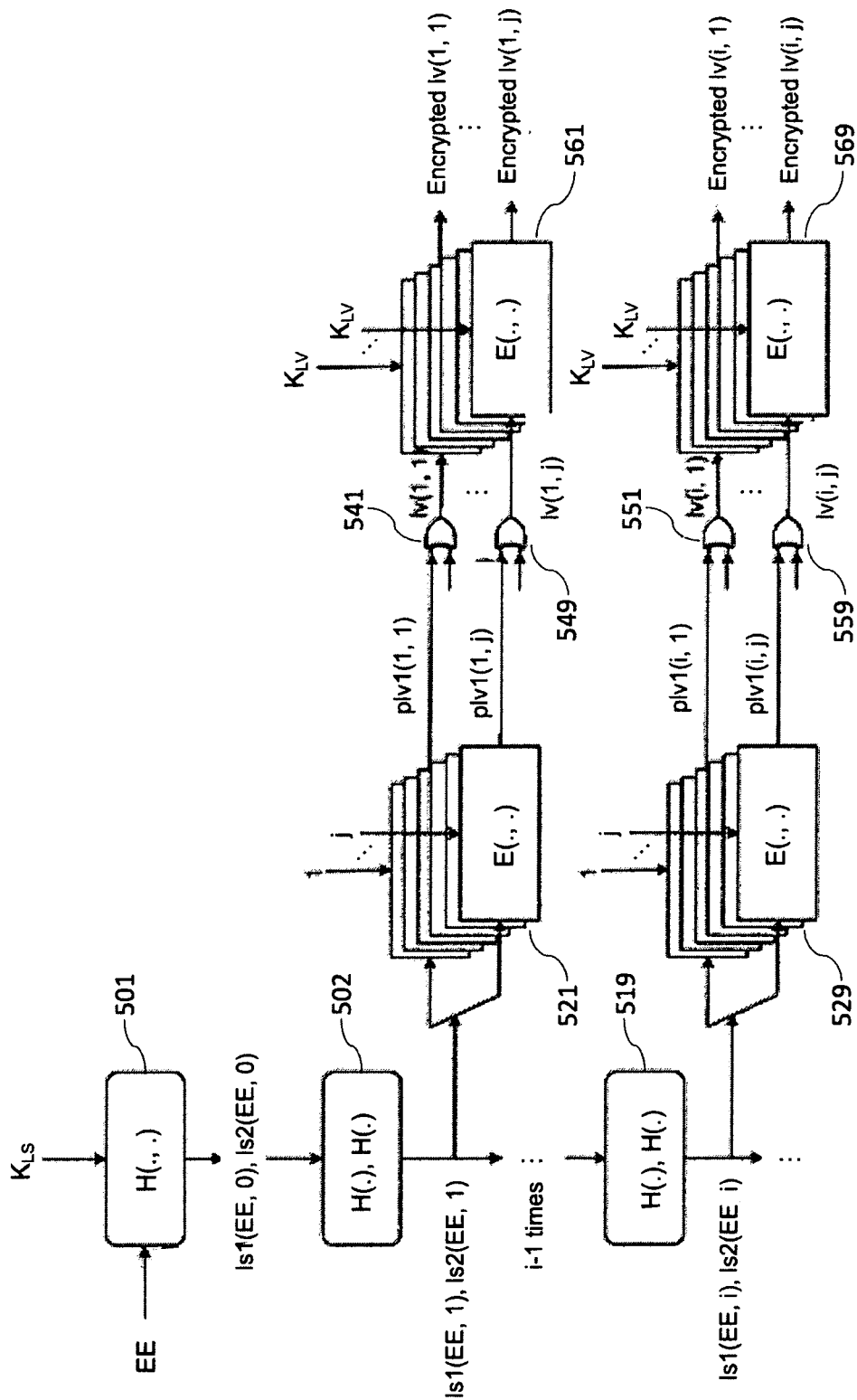
FIG. 5 is a diagram which further illustrates operation of a form of the FIG. 4 embodiment of the invention.

The diagram of FIG. 5 further illustrates operation of the just described embodiment of FIG. 3. The block 501 represents the hashing of the vehicle identifier EE with the linkage seed key $K_{LS}$ to obtain the linkage seed values Is1 and Is2. These are successively hashed (as in the SCMS procedure of FIG. 2) i–1 times, as represented by the blocks 502 . . . 519, which obtains value Is1 and Is2 for the increasing i's. The groups of planes 521 and 529 represent the obtaining of the encrypted preliminary linkage values for i=1 and all j's (planes 521) through the last value of i and all j's (planes 529). The exclusive OR gates combine prelinkage values (again, compatible with the FIG. 2 SCMS scheme) to obtain linkage values, and the sets of planes 561 and 569 represent encrypting, by the PCA, of the linkage values to obtain encrypted Iv(1,1) through encrypted Iv(1, j) (planes 561) through encrypted Iv(i, 1) through encrypted Iv(i, j) (planes 569).

The protocol of the embodiment of FIGS. 3 and 4 involves trade-offs; with maximum benefit being obtained if linkage values are being obtained over a relatively long assumed vehicle life. A disadvantage is that generating a vehicle's life's worth of linkage values upfront would require relatively large amounts of storage and communications. To overcome such disadvantages the protocol can be made stateful, in that the linkage seed generated for period i while generating the linkage values for period i can be stored at PCA in garbled form, so that it can be used in generating the linkage values for period i+1.

The described embodiments have been substantially fully compatible with SCMS, so a transition from current SCMS design to them would be transparent to vehicles. However, since privacy is guaranteed by secure computation, there is no longer a need for two separate linkage chains per vehicle. The use of single linkage seed values would provide further efficiencies. The function used for generating the linkage value can be changed to utilize only one (instead of two) linkage chain per vehicle. This results in a slightly different Boolean circuit, but other than that the rest of protocol can be as described.

The invention hereof is primarily applicable for use in a system, such as SCMS, involving vehicle-to-vehicle communication, but it will be understood that such systems typically are general enough to involve communications between vehicles and devices which are not vehicles, and that such communications may also be implemented using digital certificates and linkage values as part of an overall scheme for efficiently maintaining privacy as well as security.

It will be understood that linkage values as described herein, can alternatively be described as linkage value signals, since the processors which produce them will typically, although not necessarily, be electronic processors that produce, store, transmit, and/or receive values as electronic digital bitstreams.

The invention claimed is:

1. A method of generating one or more linkage values for pseudonym digital certificates used for vehicle to vehicle communication, the method comprising:
   determining a linkage value function that expresses linkage values associated with a digital certificate of a vehicle as a function of a linkage seed input from a pseudonym certificate authority processor, a vehicle identifier and at least one index relating to a time period for the linkage value function from a registration authority processor, each of the linkage values being associated with a different combination of the linkage seed input, the vehicle identifier, and the at least one index;
   generating a Boolean circuit representative of the linkage value function for a combination of the linkage seed input, the vehicle identifier, and the at least one index; and
   executing a garbled circuit protocol on the Boolean circuit between the registration authority processor and the pseudonym certificate authority processor, wherein the pseudonym certificate authority processor privately generates a linkage value for the combination of the linkage seed input, the vehicle identifier, and the at least one index.

2. The method of claim 1, wherein the linkage seed input comprises a linkage seed value obtained by hashing a key value with a value of a specified index.

3. The method of claim 1, further comprising:
   generating different combinations of the linkage seed input, the vehicle identifier, and the at least one index to obtain the linkage values.

4. The method of claim 2, further comprising:
   generating different combinations of the vehicle identifier and the at least one index obtain the linkage values.

5. The method of claim 1, wherein the linkage seed input is a randomly generated linkage seed value.

6. The method of claim 1, wherein the linkage seed input is a pair of randomly generated linkage seed values.

7. The method of claim 2, wherein the specified index is a vehicle identifier index.

8. The method of claim 4, wherein the specified index is a vehicle identifier index.

9. The method of claim 7, wherein a plurality of linkage seed values of the linkage seed input are obtained by hashing the key value with a plurality of values of said vehicle identifier index.

10. The method of claim 9, wherein each of the plurality of linkage seed values are utilized in deriving linkage values for respective linkage seed values.

11. The method of claim 3, further comprising:
   storing a garbled representation of the linkage seed input after the execution of the garbled circuit protocol; and
   utilizing the garbled representation during a next garbled circuit protocol execution for the vehicle identifier.

12. The method of claim 1, further comprising:
   sending, by the registration authority processor, a pseudonym certificate request to the pseudonym certificate authority processor to put a decrypted linkage value in the digital certificate.

13. A method of generating one or more linkage values for pseudonym digital certificates used for vehicle to vehicle communication, the method comprising:
   determining a linkage value function that expresses linkage values associated with a digital certificate of a vehicle, the linkage value function being encrypted with a linkage value key available to a pseudonym certificate authority processor, the linkage value key being unavailable to a registration authority processor, the linkage value function being determined as a function of a number of input parameters from the pseudonym certificate authority processor and the registration authority processor, the number of input parameters including a linkage seed key for generating linkage seed values, the linkage value key for encrypting linkage values, and a vehicle identifier, each of the linkage values being associated with a different combination of the linkage seed key, the linkage value key, and the vehicle identifier;
   generating a Boolean circuit representative of the linkage value function for a combination of a linkage seed value derived from the linkage seed key, the vehicle identifier, and a value of a linkage value sequence index for the vehicle identifier; and
   executing a garbled circuit protocol on the Boolean circuit between the registration authority processor and the pseudonym certificate authority processor such that the registration authority processor obtains encrypted linkage values, each of the encrypted linkage values corresponding to a combination of the linkage seed value, the vehicle identifier, and value of the linkage value sequence index;
   wherein the registration authority processor sends the encrypted linkage values to the pseudonym certificate authority processor to be decrypted using the linkage value key.

14. The method of claim 13, wherein the registration authority processor sends a pseudonym certificate request to the pseudonym certificate authority processor to put a respective decrypted linkage value in the digital certificate.

15. The method of claim 13, further comprising:
   repeating determining the linkage value function, generating the Boolean circuit and executing the garbled circuit protocol for different vehicle identifiers.

16. The method of claim 13, further comprising:
   storing, at the pseudonym certificate authority processor, a garbled representation of the linkage seed value after the execution of the garbled circuit protocol; and
   utilizing the garbled representation during a next garbled circuit protocol execution for a same vehicle identifier.

17. A method of generating one or more linkage values for pseudonym digital certificates used for vehicle to vehicle communication, the method comprising:
   determining a linkage value function that expresses linkage value signals associated with a digital certificate of a vehicle as a function of a linkage seed input signal from a pseudonym certificate authority processor, a vehicle identifier, and at least one index relating to a time period for the linkage value signals from a registration authority processor, wherein the linkage value signals are generated using different combinations of the linkage seed input signal, the vehicle identifier, and the at least one index;

generating a Boolean circuit representative of the linkage value function for a combination of the linkage seed input signal, the vehicle identifier and the at least one index; and executing a garbled circuit protocol on the Boolean circuit between the registration authority processor and the pseudonym certificate authority processor, whereby the pseudonym certificate authority processor privately generates a linkage value signal for the combination of the linkage seed input signal, the vehicle identifier, and the at least one index.

18. The method of claim 17, wherein the linkage seed input signal is at least one randomly generated linkage seed value.

19. The method of claim 17, further comprising:

storing a garbled representation of the linkage seed input signal after the execution of the garbled circuit protocol; and utilizing the garbled representation during a next garbled circuit protocol execution for the vehicle identifier.

20. The method of claim 17, further comprising:

sending, by the registration authority processor, a pseudonym certificate request to the pseudonym certificate authority processor to put a decrypted linkage value in the digital certificate.

21. A method of generating one or more linkage values for pseudonym digital certificates used for vehicle to vehicle communication, the method comprising:

determining a linkage value function that expresses linkage values associated with a digital certificate of a vehicle as a function of a linkage seed input from a pseudonym certificate authority processor, a vehicle identifier and at least one index relating to a time period for the linkage value function from a registration authority processor, the linkage seed input including a linkage seed value obtained by hashing a key value with a value of a specified index, each of the linkage values being associated with a different combination of the linkage seed input, the vehicle identifier and the at least one index, the linkage values corresponding to different combinations of the linkage seed input, the vehicle identifier, and the at least one index;

generating a Boolean circuit representative of the linkage value function for a combination of the linkage seed input, the vehicle identifier, and the at least one index; and executing a garbled circuit protocol on the Boolean circuit between the registration authority processor and the pseudonym certificate authority processor, wherein the pseudonym certificate authority processor privately generates a linkage value for the combination of the linkage seed input, the vehicle identifier, and the at least one index.

22. The method of claim 21, wherein the linkage seed input is at least one randomly generated linkage seed value.

23. The method of claim 21, wherein the specified index is a vehicle identifier index.

24. The method of claim 23, wherein a plurality of linkage seed values of the linkage seed input are obtained by hashing the key value with a plurality of values of said vehicle identifier index.

* * * * *